June 3, 1958
J. COX
2,836,922
FISHHOOK FOR ATTACHING LIVE BAIT
Filed July 18, 1955
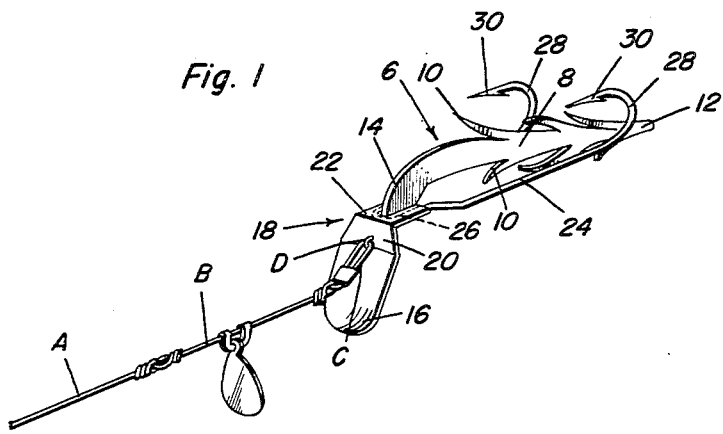
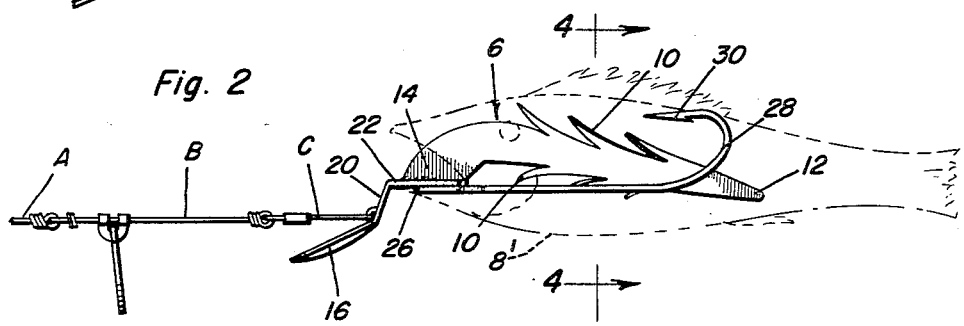
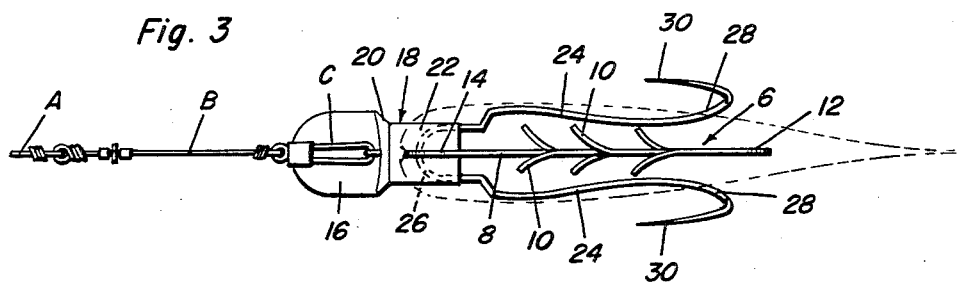
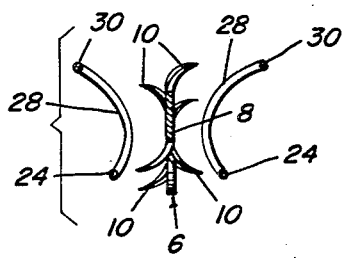
Jacob Cox
INVENTOR.

United States Patent Office 2,836,922
Patented June 3, 1958

2,836,922
FISHHOOK FOR ATTACHING LIVE BAIT
Jacob Cox, Ironwood, Mich.
Application July 18, 1955, Serial No. 522,659
2 Claims. (Cl. 43—44.2)

The present invention relates to a novel combination bait holder and fishhook and has reference to a construction which is characterized by a dual arrangement of fishhooks and an intervening bait holder serving to support a minnow or the like.

Another object of the invention is to provide a simple, practical and economical fishing accessory wherein the bait holder is preferably made of shiny light reflecting metal and which therefore embodies a desired luster and is in and of itself a lure, that is, even when the same is not provided with pork rind or a live-bait in the so-called "minnow" category.

In carrying out a preferred embodiment of the invention the bait holder is generally J-shaped in side elevation with the curved leading end joined to a depending spoon-like baffle or plate and with the trailing end pointed to spear the minnow and the upper and lower edge portions provided with spine-like spurs to assist in holding the bait thereon, there being a pair of fishhooks, one located on each side of the intervening bait holder and the leading ends of the shank portions being attached to web-like means affording a suitable connection between the baffle plate and the J-shaped holder.

Other objects, features and advantages will become more readily apparent from the following description and the accompanying sheet of drawings.

In the drawings:

Fig. 1 is a perspective view of a bait holder and fishhook combination;

Fig. 2 is a side elevation of the same;

Fig. 3 is a top plan view; and

Fig. 4 is a section on line 4—4 of Fig. 2.

Referring now to the drawings the J-shaped member is denoted by the numeral 6. It is preferably a relatively thin plate which is substantially J-shaped in side elevation. It is preferably chromium plated or otherwise made shiny or lustrous to reflect light. The plate serves as a holder for the attachable and detachable minnow or other bait 8' shown in phantom lines in Figure 2. The shank portion 8 of the member 6 is provided on its upper and lower edges with struck-out tongues 10 bent in alternate directions and providing spurs to impale the bait thereon. The rear end is tapered or pointed to provide a spear 12 to penetrate and to assist in placing the minnow in the desired position. The gradually curved leading end portion 14 is connected with the spoon-like baffle or plate 16. The baffle is of any appropriate size and may be either flat or slightly dished in the manner shown. The lure includes a web means 18 which has a substantially vertical portion 20 and a horizontal portion 22 whereby to provide a suitable connection between the plate and J-shaped member. There are two fishhooks and they have their respective shank portions 24 located on opposite sides of the intervening bait holder and their adjacent ends joined by a U-shaped portion 26 which underlies and is welded or otherwise fixed to the web or connecting member 22. The arcuate return-bends 28 provide forwardly and upwardly curved bill portions which terminate in suitable barbs 30. Thus the shanks are in spaced parallelism or approximately so with each other and are located outwardly of and generally parallel to the opposite vertical sides of the intervening bait holder 6.

It will be noted that the spoon-like baffle which serves to cause the device to wobble and otherwise animate itself as it is drawn through the water is so situated that it does not block the leading end of the over-all baited device. The baffle may have a curvature and size to give the device proper action and to cause the minnow to weave and wobble and to give it an attractive motion to lure fish. It may be relied upon to assist in causing the device to dip or dive depending on the manner in which the fishing line A is maneuvered. Incidentally, this is connected by a leader B to a fastener C which is in turn connected by a staple or the like D to the vertical portion of the web means 18. The two hooks are preferably made from one continuous piece of metal which is bent between its ends to form the U-shaped bend 26. With the hooks located in the manner shown they are practically weedless and there is no hook dragging along underneath the lure to catch on submerged logs and vegetation.

Changes in shape, size and rearrangement of features may be resorted to in actual practice without departing from the scope of the claims.

What is claimed as new is as follows:

1. A fishing device comprising a length of wire defining a member generally U-shaped in plan, said member embodying a bight portion and a pair of elongated coplanar limbs, said limbs embodying shank portions disposed in spaced apart relationship, the rear end portions of said shank portions being free and formed into upstanding return bends defining fishhooks, a horizontal plate superimposed on and fixed to said bight portion, an oblique angled spoon connected by a web to the forward end of said plate, a substantially J-shaped minnow impaling member having a curved leading end portion at approximate right angles to and joined rigidly with and rising above said horizontal plate, the body portion of said impaling member being, for the most part, in a plane above the plane of said shank portions and having the additional function of an artificial lure, the rear end portion of said impaling member projecting rearwardly of said return bends and to a position slightly below the plane occupied by said shank portions.

2. The structure defined in claim 1 wherein said rear end of the impaling member is tapered to provide a spear-like point which assists in placing a minnow in the desired position of use on said impaling member, and the upper and lower lengthwise edges of said impaling member being provided with struck-out tongues bent in alternating directions and having sharp-pointed terminals providing spur-like retaining elements for the minnow.

References Cited in the file of this patent
UNITED STATES PATENTS

| 2,012,786 | Hoage | Aug. 27, 1935 |
| 2,017,333 | Zuck | Oct. 15, 1935 |
| 2,196,376 | Anderson | Apr. 9, 1940 |
| 2,476,126 | Weiss | July 12, 1949 |
| 2,632,276 | Hale | Mar. 24, 1953 |
| 2,668,387 | Gallardo | Feb. 9, 1953 |